(12) United States Patent  (10) Patent No.: US 9,091,575 B2
Adachi et al.  (45) Date of Patent: Jul. 28, 2015

(54) ULTRASONIC FLOW-METER

(75) Inventors: Akihisa Adachi, Nara (JP); Masato Satou, Nara (JP); Aoi Watanabe, Nara (JP); Hajime Miyata, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 14/128,866

(22) PCT Filed: Jul. 9, 2012

(86) PCT No.: PCT/JP2012/004423
§ 371 (c)(1),
(2), (4) Date: Dec. 23, 2013

(87) PCT Pub. No.: WO2013/008445
PCT Pub. Date: Jan. 17, 2013

(65) Prior Publication Data
US 2014/0230568 A1   Aug. 21, 2014

(30) Foreign Application Priority Data
Jul. 13, 2011   (JP) ................................. 2011-154546

(51) Int. Cl.
*G01F 1/66* (2006.01)
*G01F 5/00* (2006.01)

(52) U.S. Cl.
CPC *G01F 1/66* (2013.01); *G01F 1/667* (2013.01); *G01F 5/00* (2013.01)

(58) Field of Classification Search
CPC ................ G01F 1/66; G01F 1/37; G01F 1/34
USPC ................ 73/861.28, 861.52, 861.42, 861.31
See application file for complete search history.

(56) References Cited

U.S. PATENT DOCUMENTS 5,837,903 A * 11/1998 Weigand .................... 73/861.42
6,601,460 B1    8/2003 Materna
(Continued)

FOREIGN PATENT DOCUMENTS

EP       1 612 520 A1    1/2006
JP       2003-185477 A   7/2003
(Continued)

OTHER PUBLICATIONS

Extended European Search Report in corresponding European Application No. 12811957.5, dated Jun. 16, 2014, 8 pages.
International Search Report for International Application No. PCT/JP2012/004423, dated Oct. 9, 2012, 2 pages.

*Primary Examiner* — Jewel V Thompson
(74) *Attorney, Agent, or Firm* — Brinks Gilson & Lione (57) ABSTRACT

An ultrasonic flow-meter of the present invention includes a partition plate which partitions a passage of a target fluid into a measurement passage and a non-measurement passage, a pair of ultrasonic transducers which is disposed in the measurement passage, a measuring unit which measures a propagation time of an ultrasonic wave between the pair of ultrasonic transducers, and a calculating unit which calculates a flow rate of the target fluid. Further, the calculating unit has a computing unit which computes at least one of a flow velocity and a flow rate of the target fluid in the measurement passage based on the propagation time and an estimating unit which estimates the flow rate of the target fluid in the passage based on the flow velocity or the flow rate in the measurement passage. As a result, an ultrasonic flow-meter which highly accurately measures a target fluid by using a simple configuration can be realized.

10 Claims, 8 Drawing Sheets

(56) References Cited

U.S. PATENT DOCUMENTS

| | | | |
|---|---|---|---|
| 7,464,611 B2 * | 12/2008 | Matter et al. | 73/861.52 |
| 7,472,610 B2 * | 1/2009 | Clerc et al. | 73/862.52 |
| 2009/0188303 A1 | 7/2009 | Ooishi | |
| 2010/0064821 A1 | 3/2010 | Nakabayashi et al. | |
| 2015/0020608 A1 * | 1/2015 | Chevrier et al. | 73/861.31 |

FOREIGN PATENT DOCUMENTS

| | | |
|---|---|---|
| JP | 2004-251686 A | 9/2004 |
| JP | 2008-122106 A | 5/2008 |
| JP | 2010-066068 A | 3/2010 |
| WO | WO 94/05977 A1 | 3/1994 |
| WO | WO 95/08065 A1 | 3/1995 |

* cited by examiner

ULTRASONIC FLOW-METER

This application is a 371 application of PCT/JP2012/004423 having an international filing date of Jul. 9, 2012, which claims priority to JP2011-154546 filed Jul. 13, 2011, the entire contents of which are included herein by reference.

TECHNICAL FIELD

The present invention relates to an ultrasonic flow-meter which measures a part of flow of target fluid and estimates a flow rate of the whole target fluid.

BACKGROUND ART

As one of conventional ultrasonic flow-meters of this type described above, there is known an ultrasonic flow-meter in which a passage is equally partitioned into a plurality of passages and an ultrasonic sonar is disposed in one of the partitioned passages (for example, see Patent Literature 1).

Figure 12:
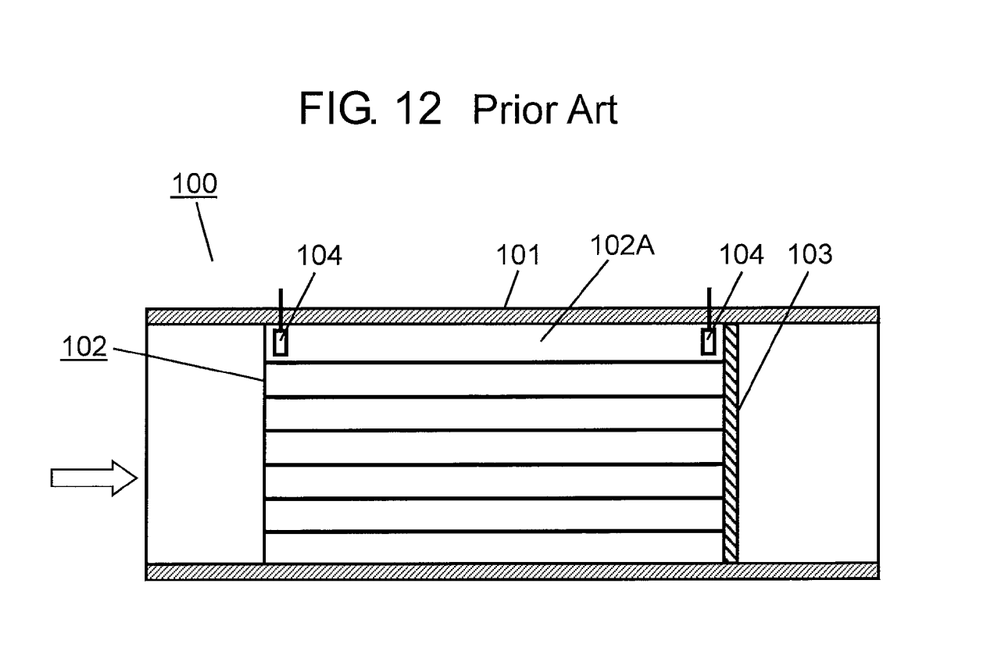
FIG. 12 is a cross-sectional view of a conventional ultrasonic flow-meter.

The conventional ultrasonic flow-meter will be described below with reference to FIG. 12. FIG. 12 is a cross-sectional view of the conventional ultrasonic flow-meter.

As illustrated in FIG. 12, conventional ultrasonic flow-meter 100 includes cylindrical basic passage 101, cylindrical honeycomb structural bodies 102 (passage partitioning members), circular mesh 103, and a pair of ultrasonic sonars 104. Cylindrical honeycomb structural bodies 102 are provided in cylindrical basic passage 101 and arranged to equally partition cylindrical basic passage 101 into a plurality of passages. Circular mesh 103 is disposed at a downstream side of cylindrical honeycomb structural bodies 102 of cylindrical basic passage 101 and rectifies a target fluid of cylindrical basic passage 101. The pair of ultrasonic sonars 104 are disposed near an inlet (at an upstream side) and an outlet (at a downstream side) of measurement passage 102A which is formed by at least one of cylindrical honeycomb structural bodies 102 of partitioned cylindrical basic passage 101.

With that arrangement, the flow of the target fluid flowing in cylindrical basic passage 101 is rectified to cancel deviation of the flow and prevent the flow from being turbulent. As a result, it is believed that the flow rate or the flow velocity of the target fluid can be measured accurately.

Further, Patent Literature 1 discloses not only the above described configuration of cylindrical basic passage 101 but also a configuration of partitioning a passage by providing a passage with a rectangular cross section and rectifying plates arranged at equal intervals and extending in parallel with a flow of the target fluid flowing through the passage.

However, the configuration of the conventional ultrasonic flow-meter is restricted in the arrangement such that the flow-meter needs to have respective partitioned cylindrical honeycomb structural bodies 102 (passage partitioning members) disposed evenly, so as to cause an average flow rate of the target fluid flowing through cylindrical basic passage 101 to flow in measurement passage 102A having the pair of ultrasonic sonars arranged inside.

In addition, since the conventional ultrasonic flow-meter needs to dispose members having large pressure losses such as the circular mesh at outlets of the cylindrical honeycomb structural bodies (passage partitioning members) to equalize the flow of the target fluid, a range of flow rate is problematically narrowed.

PTL 1: Unexamined Japanese Patent Publication No. 2003-185477

SUMMARY OF THE INVENTION

In order to solve the above described problem, an ultrasonic flow-meter of the present invention includes a partition plate which partitions a passage of a target fluid and a non-measurement passage, a pair of ultrasonic transducers which are disposed in the measurement passage, a measuring unit which measures a propagation time of an ultrasonic wave between the pair of ultrasonic transducers, and a calculating unit which calculates a flow rate of the target fluid. Further, the calculating unit has a computing unit which computes at least one of a flow velocity and a flow rate of the target fluid in the measurement passage based on the propagation time, and an estimating unit which estimates the flow rate of the target fluid in the passage based on the flow velocity or the flow rate in the measurement passage.

Accordingly, dividing ratio (Qn/Qm) between the flow rate of the measurement passage and the flow rate of the non-measurement passage can be kept almost constant (including constant) throughout a whole measuring range of the flow rate, where Qm is the flow rate of the measurement passage and Qn is the flow rate of the non-measurement passage. As a result, the ultrasonic flow-meter can accurately estimate and measure the flow rate or the flow velocity of the target fluid flowing through the whole passage by measuring the flow rate or the flow velocity of the target fluid flowing through the measurement passage serving as a part of the passage.

DESCRIPTION OF EMBODIMENTS

Exemplary embodiments of the present invention will be described below with reference to the drawings. It should be noted that the present invention is not limited to the exemplary embodiments. The same or corresponding constituent elements will be denoted by the same reference symbols and described in the exemplary embodiments below.

First Exemplary Embodiment

An ultrasonic flow-meter according to a first exemplary embodiment of the present invention will be described below with reference to FIG. 1 to FIG. 4.

Figure 1:
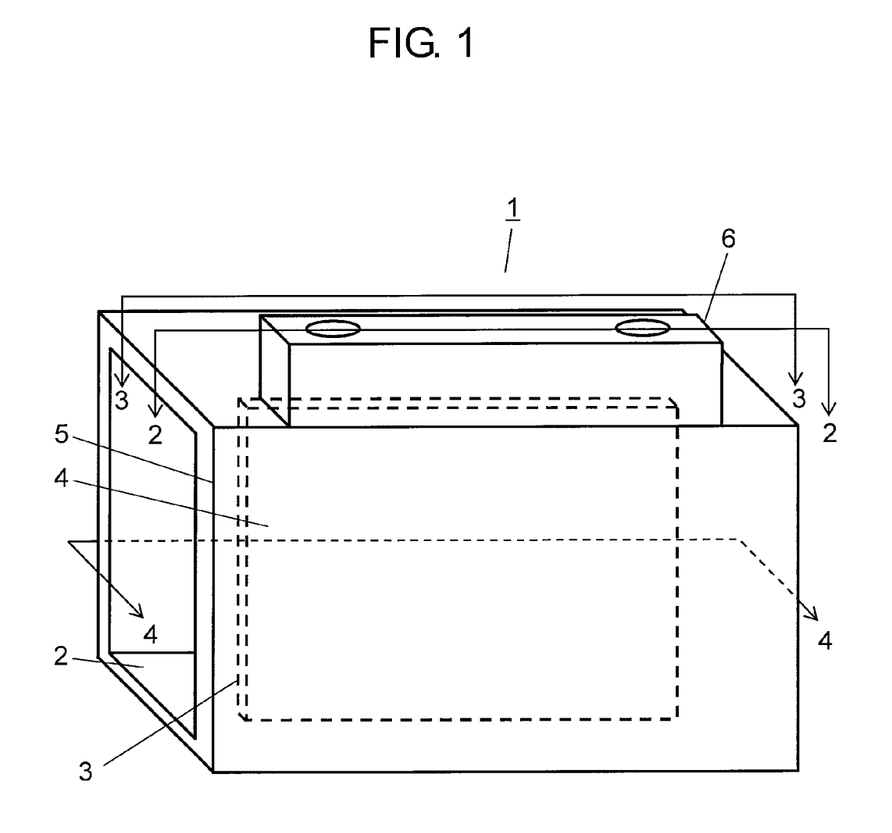
FIG. 1 is a schematic block diagram of an ultrasonic flow-meter according to a first exemplary embodiment of the present invention.
Figure 2:
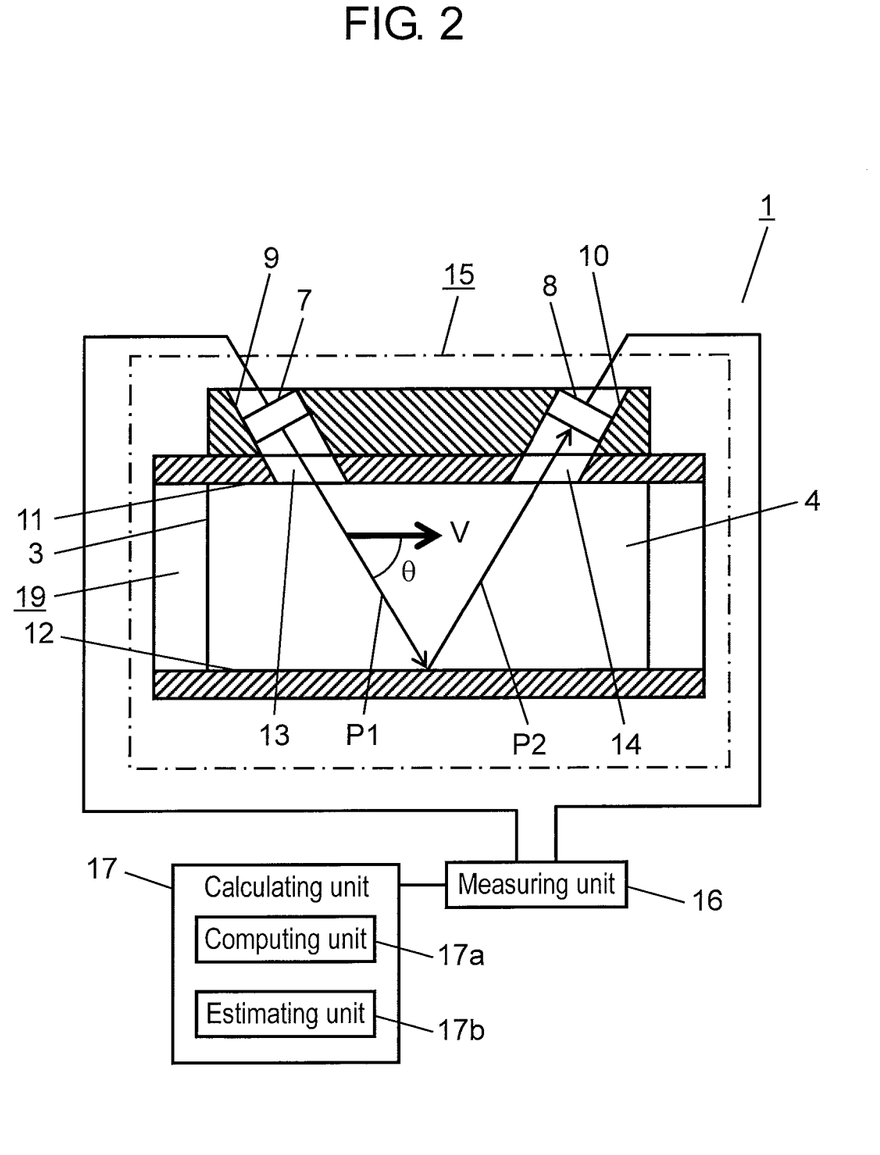
FIG. 2 is a cross-sectional view taken along line 2-2 of FIG. 1 according to the first exemplary embodiment of the present invention.
Figure 3:
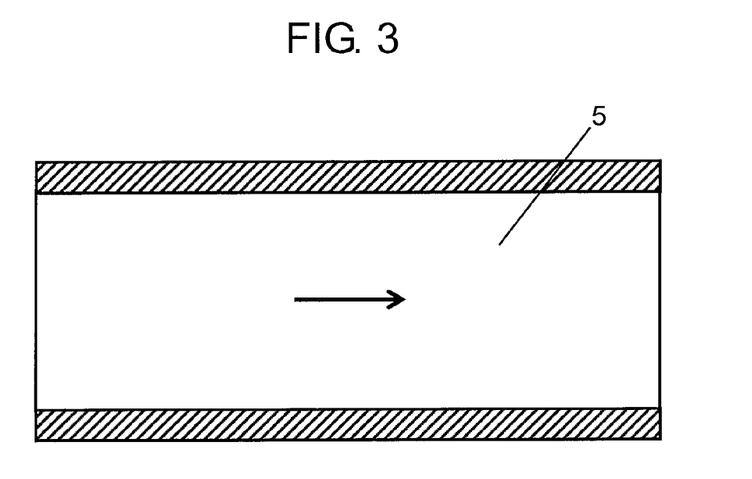
FIG. 3 is a cross-sectional view taken along line 3-3 of FIG. 1 according to the first exemplary embodiment of the present invention.
Figure 4:
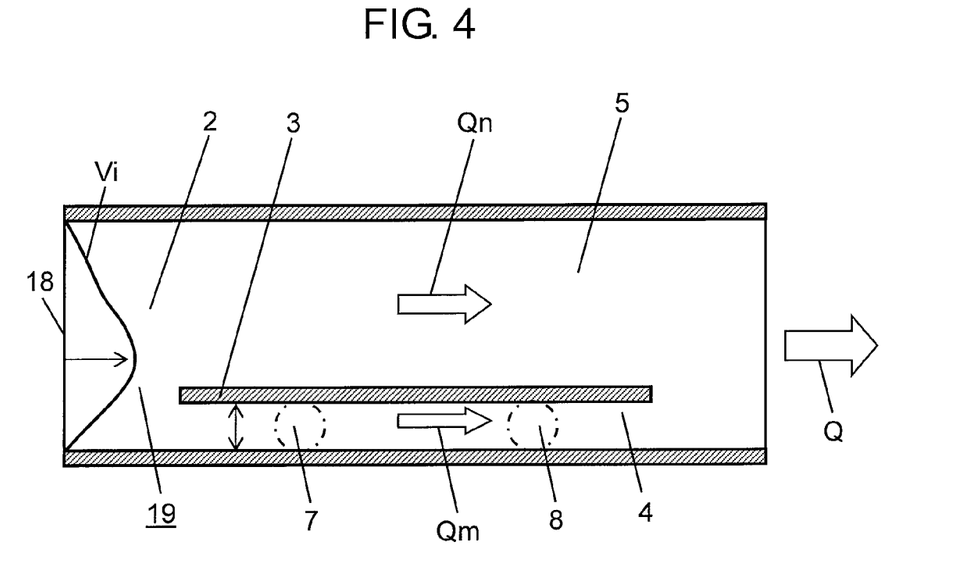
FIG. 4 is a cross-sectional view taken along line 4-4 of FIG. 1 according to the first exemplary embodiment of the present invention.

FIG. 1 is a schematic block diagram of the ultrasonic flow-meter according to the first exemplary embodiment of the present invention. FIG. 2 is a cross-sectional view taken along line 2-2 of FIG. 1 according to the first exemplary embodiment of the present invention. FIG. 3 is a cross-sectional view taken along line 3-3 of FIG. 1 according to the first exemplary embodiment of the present invention. FIG. 4 is a cross-sectional view taken along line 4-4 of FIG. 1 according to the first exemplary embodiment of the present invention.

As illustrated in FIG. 1, ultrasonic flow-meter 1 of the exemplary embodiment includes at least tubular passage 2 with, for example, a rectangular cross section, one partition plate 3 which partitions tubular passage 2 into measurement passage 4 and non-measurement passage 5 along a direction of a flow of a target fluid, and ultrasonic transducer holding part 6 for holding the pair of ultrasonic transducers which are provided correspondingly to each other in measurement passage 4. Hereafter, tubular passage 2 may be simply described as passage 2.

As illustrated in FIG. 2, ultrasonic transducer holding part 6 holds the pair of ultrasonic transducers including first ultrasonic transducer 7 and second ultrasonic transducer 8 with first holding part 9 and second holding part 10, respectively.

Measurement passage 4 has inner upper surface 11 and inner lower surface 12, and inner upper surface 11 of measurement passage 4 has first ultrasonic transparent window 13 and second ultrasonic transparent window 14. On the other hand, inner lower surface 12 of measurement passage 4 functions as a reflective surface for ultrasonic waves emitted from first ultrasonic transducer 7 and second ultrasonic transducer 8. Then, the ultrasonic waves emitted from first ultrasonic transducer 7 and second ultrasonic transducer 8 transverse measurement passage 4 and are reflected from inner lower surface 12 of measurement passage 4 and propagate through propagation paths denoted by arrow P1 and arrow P2.

Therefore, at least first ultrasonic transducer 7, second ultrasonic transducer 8, and inner lower surface 12 of measurement passage 4 configure flow rate measuring unit 15 for measuring a flow rate or a flow velocity of the target fluid.

The signals received by first ultrasonic transducer 7 and second ultrasonic transducer 8 are processed in measuring unit 16 including a measuring circuit, and a propagation time between first ultrasonic transducer 7 and second ultrasonic transducer 8 is determined. Then, at least one of the flow rate and the flow velocity of the target fluid flowing through tubular passage 2 is estimated and calculated by computing unit 17a and estimating unit 17b which are included in calculating unit 17.

Meanwhile, as illustrated in FIG. 3, in the exemplary embodiment, such a member as a structural body or a flow-rectifying member for changing a flow condition of the target fluid as described in the exemplary embodiments below is not particularly installed in non-measurement passage 5.

Further, as illustrated in FIG. 4, introductory space part 19 (a passage from partition plate 3 to inlet part 18) is provided upstream of partition plate 3 in tubular passage 2. Therefore, a flow of the target fluid flowing into tubular passage 2 from inlet part 18 is once rectified in introductory space part 19.

Subsequently, the rectified target fluid is divided by partition plate 3, so that a part of the target fluid flows into measurement passage 4 and the rest flows into non-measurement passage 5. With that configuration, turbulence of the flow of the target fluid in measurement passage 4 can be reduced. As a result, ultrasonic flow-meter 1 can accurately estimate the flow rate and the flow velocity of the target fluid flowing through tubular passage 2 for a wide range of the flow rate or a wide range of flow velocity by measuring the flow velocity and the flow rate of the target fluid of measurement passage 4.

Then, at least one of the flow velocity and the flow rate of the target fluid which has divided into measurement passage 4 is performed via measuring unit 16 by using the propagation time measured by flow rate measuring unit 15, and is calculated in computing unit 17a of calculating unit 17. Subsequently, the flow velocity and the flow rate of the target fluid flowing through whole tubular passage 2 can be estimated and calculated in estimating unit 17b of calculating unit 17 based on the flow velocity and the flow rate of the target fluid in measurement passage 4 which have been calculated in computing unit 17a.

Ultrasonic flow-meter 1 of the exemplary embodiment has been configured as described above.

Operation and functions of ultrasonic flow-meter 1 of the above described configuration will be described below.

Here, as illustrated in FIG. 4, it is assumed that the target fluid having, for example, a flow velocity distribution Vi flows into tubular passage 2 from inlet part 18 of tubular passage 2.

First, the target fluid which has been just flown into tubular passage 2 is rectified in introductory space part 19. Subsequently, the rectified target fluid is split by partition plate 3 and divided into two passages of measurement passage 4 and non-measurement passage 5. Therefore, the flow rate of the target fluid in measurement passage 4 has become Qm and the flow rate of the target fluid in non-measurement passage 5 has become Qn.

Then, the target fluid flowing through measurement passage 4 with the flow rate of Qm passes through the propagation path for ultrasonic waves emitted from first ultrasonic transducer 7 and second ultrasonic transducer 8. On that occasion, a flow velocity component, along the propagation path for the ultrasonic waves, of the target fluid flowing through measurement passage 4 is detected based on the propagation time of the ultrasonic wave received by first ultrasonic transducer 7 or second ultrasonic transducer 8. Then, a measurement method to be described below is used in determination (calculation) of the flow velocity or the flow rate of the target fluid flowing through measurement passage 4 with the flow rate of Qm.

A measurement method of the flow rate and the flow velocity of the target fluid, the method being performed in ultrasonic flow-meter 1 of the above described configuration will be specifically described below with reference to FIG. 2.

Here, as illustrated in FIG. 2, it is assumed that the flow velocity of the target fluid flowing through tubular passage 2 is V, a sound velocity in the target fluid is C, and an angle formed by a flow direction of the target fluid with arrow P1 is θ, the arrow P1 indicating an ultrasonic wave propagation direction (propagation path) before the ultrasonic wave is reflected from inner lower surface 12.

Further, as described above, an effective length (distance) of the propagation paths for the ultrasonic waves which propagate through first ultrasonic transducer 7 and second ultrasonic transducer 8 denoted as the propagation paths of arrows P1 and P2 in FIG. 2 is L.

Here, propagation time t1 for the ultrasonic wave sent out from first ultrasonic transducer 7 to reach second ultrasonic transducer 8 is expressed as equation (1) below:

$$t1 = L/(C + V\cos\theta) \quad (1)$$

Further, propagation time t2 for the ultrasonic wave sent out from second ultrasonic transducer 8 to reach first ultrasonic transducer 7 is expressed as equation (2) below:

$$t2 = L/(C - V\cos\theta) \quad (2)$$

Then, sound velocity C of the target fluid is canceled in equation (1) which indicates propagation time t1 and equation (2) which indicates propagation time t2, and equation (3) below is obtained:

$$V = (L/2\cos\theta) \cdot ((1/t1) - (1/t2)) \quad (3)$$

Here, as it is apparent from equation (3), on the condition that distance L of first ultrasonic transducer 7 added to second ultrasonic transducer 8 and angle θ are known, flow velocity V of the target fluid can be obtained by the method below by using propagation time t1 and propagation time t2.

First, propagation time t1 and propagation time t2 are measured in measuring unit 16.

Then, flow velocity V of the target fluid is computed in computing unit 17a of calculating unit 17 according to above described equation (3).

Further, computing unit 17a multiplies computed flow velocity V by cross section S of measurement passage 4 and also by correction factor p to obtain flow rate Qm of the target fluid in measurement passage 4.

Then, estimating unit 17b of calculating unit 17 multiplies above obtained flow rate Qm by factor q which is for estimating the flow rate of the target fluid flowing through whole tubular passage 2. Therefore, the flow rate of the target fluid flowing through whole tubular passage 2 is estimated, and flow rate Q (Qm+Qn) of whole tubular passage 2 can be obtained.

As described above, according to ultrasonic flow-meter 1 of the exemplary embodiment, the target fluid can be divided into measurement passage 4 only by one partition plate 3 in tubular passage 2 with a rectangular cross section. Therefore, a simpler and more compact ultrasonic flow-meter than the conventional ultrasonic flow-meter which uses multiple partition plates to divide a flow into multiple flows can be realized.

That is, in the case where only a laminar flow or a turbulent flow fills a whole range of the flow rate of the target fluid measured by the ultrasonic flow-meter, dividing ratio (Qn/Qm) can be kept relatively constant where Qm is the flow rate of measurement passage 4 and Qn is the flow rate of non-measurement passage 5. As a result, ultrasonic flow-meter 1 can accurately estimate and obtain entire flow rate Q of the target fluid flowing through tubular passage 2 based on flow rate Qm of the measurement passage.

Second Exemplary Embodiment

An ultrasonic flow-meter according to a second exemplary embodiment of the present invention will be described below with reference to FIG. 5. Descriptions of the same constituent elements, functions, and the like as those of the ultrasonic flow-meter of the first exemplary embodiment will be omitted.

Figure 5:
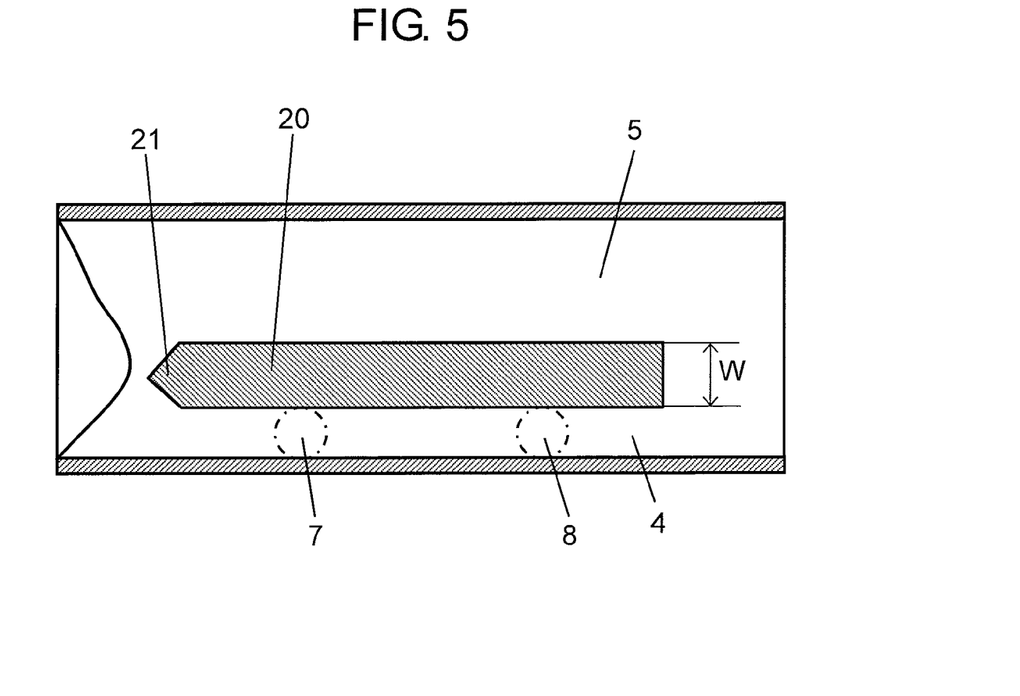
FIG. 5 is a cross-sectional view of an ultrasonic flow-meter according to a second exemplary embodiment of the present invention.

FIG. 5 is a cross-sectional view of an ultrasonic flow-meter according to the second exemplary embodiment of the present invention. FIG. 5 illustrates a cross-sectional view of the ultrasonic flow-meter of the second exemplary embodiment taken along line 4-4 shown in FIG. 1 as in FIG. 4 described in the first exemplary embodiment.

As illustrated in FIG. 5, the ultrasonic flow-meter of the second exemplary embodiment is different from the ultrasonic flow-meter of the first exemplary embodiment in that upstream end 21 of partition plate 20 is formed in a wedge shape. Since the other constituent elements are basically the same as those in the first exemplary embodiment, the constituent elements will be denoted by the same reference symbols and described.

That is, as illustrated in FIG. 5, upstream end 21 of partition plate 20 is formed in a triangular shape, for example, a wedge shape, so that width W of partition plate 20 is tapered to upstream end 21. That shape reduces turbulence of the target fluid which occurs when the fluid is divided by partition plate 20. Meanwhile, a tip of partition plate 20 needs not to be in an edged shape and may be in a shape which has curvature.

According to the exemplary embodiment, the wedge shaped tip of upstream end 21 of partition plate 20 can divide the target fluid into measurement passage 4. Therefore, turbulence of the target fluid is reduced and the target fluid which has been flown into tubular passage 2 can smoothly be divided into measurement passage 4 and non-measurement passage 5. Accordingly, dividing ratio (Qn/Qm) can be kept more constant. As a result, the ultrasonic flow-meter can accurately estimate and obtain entire flow rate Q of the target fluid flowing through tubular passage 2 based on flow rate Qm of measurement passage 4.

Third Exemplary Embodiment

An ultrasonic flow-meter according to a third exemplary embodiment of the present invention will be described below with reference to FIG. 6 to FIG. 7B. Descriptions of the same constituent elements, functions, and the like as those of the ultrasonic flow-meter of the first exemplary embodiment will be omitted.

Figure 6:
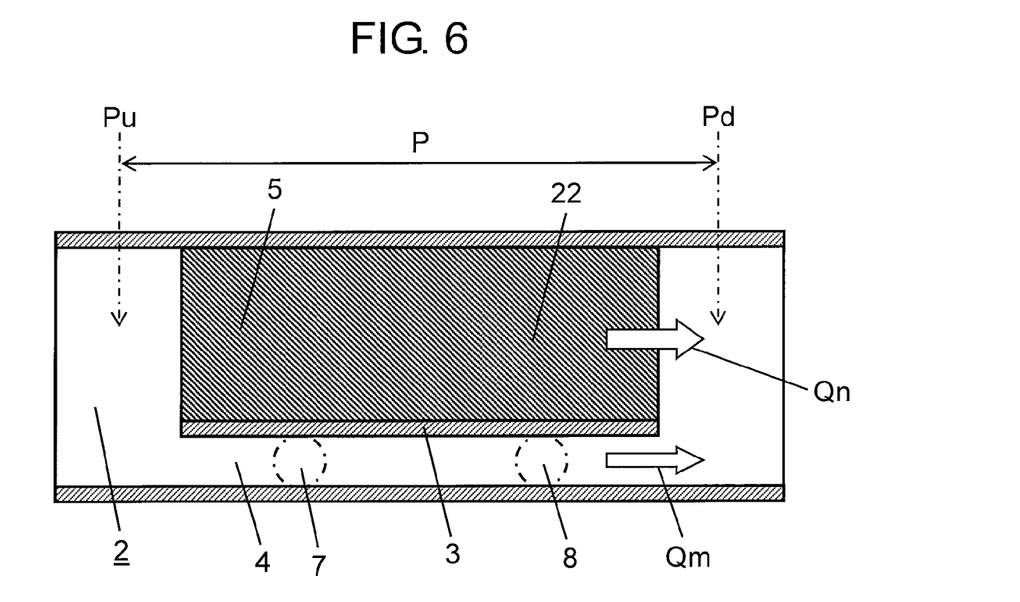
FIG. 6 is a cross-sectional view of an ultrasonic flow-meter according to a third exemplary embodiment of the present invention.

FIG. 6 is a cross-sectional view of an ultrasonic flow-meter according to the third exemplary embodiment of the present invention. FIG. 7A is a diagram illustrating an example of graph of pressure-flow rate characteristics according to the third exemplary embodiment of the present invention. FIG. 7B is a diagram illustrating another example of graph of pressure-flow rate characteristics according to the third exemplary embodiment of the present invention. FIG. 6 illustrates a cross-sectional view of the ultrasonic flow-meter of the third exemplary embodiment taken along line 4-4 shown in FIG. 1 as in FIG. 4 described in the first exemplary embodiment.

As illustrated in FIG. 6, the ultrasonic flow-meter of the third exemplary embodiment is different from the ultrasonic flow-meter of the first exemplary embodiment in that structural body 22 made of resistance body 22 is disposed in non-measurement passage 5. Since the other constituent elements are basically the same as those in the first exemplary embodiment, the constituent elements will be denoted by the same reference symbols and described.

That is, as illustrated in FIG. 6, resistance body 22, for example, of a mesh shape or made of a metal fiber and the like is disposed in non-measurement passage 5 as a structural body to adjust a pressure loss and the like. Therefore, as described below, the ultrasonic flow-meter of the exemplary embodiment can make transition from a laminar flow to a turbulent flow occur in the target fluids which are flowing into measurement passage 4 and non-measurement passage 5 by the same pressure difference. As a result, variation in dividing ratio (Qn/Qm) caused by fluctuation in the flow rate of the target fluid is reduced and a decrease in measuring accuracy of the ultrasonic flow-meter can further be reduced.

Operation and functions of ultrasonic flow-meter 1 of the exemplary embodiment will be described below.

First, as illustrated in FIG. 6, relationship between the pressure difference (differential pressure) P at point Pu and point Pd in tubular passage 2 and flow rate Qm of the fluid through measurement passage 4 and flow rate Qn of the fluid through non-measurement passage 5 will be described.

Generally, in the hydrodynamics, in the case where the flow of a fluid is laminar, the flow rate and the pressure difference are in linear (proportional) relationship. On the other hand, in the case where the flow of a fluid is turbulent, it is known that the flow rate and the pressure difference are in square (nonlinear) relationship. Therefore, the above described relationship can be also applied to measurement passage 4 and non-measurement passage 5 into which tubular passage 2 is split by partition plate 3.

Figure 7A:
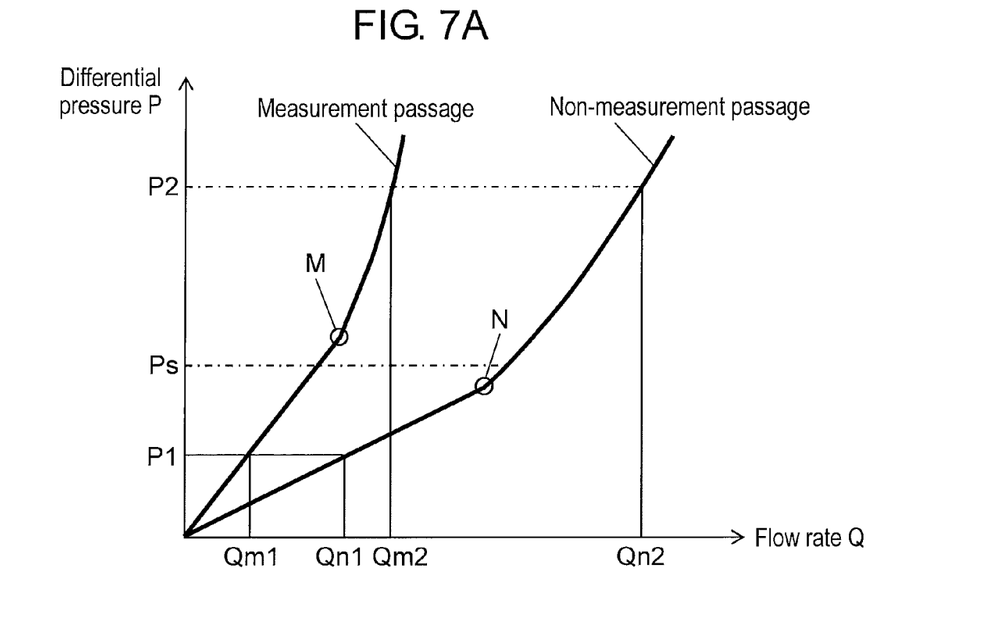
FIG. 7A is a diagram illustrating an example of graph of pressure-flow rate characteristics according to the third exemplary embodiment of the present invention.

Here, FIG. 7A is a graph schematically showing the above described relationship. That is, as in FIG. 7A, it is shown that the flow is laminar before transition point M and turbulent after transition point M in measurement passage 4. Also, it is shown that the flow is laminar before transition point N and turbulent after transition point N in non-measurement passage 5.

Under the condition of pressure difference P1, both of measurement passage 4 and non-measurement passage 5 are in laminar areas, therefore, dividing ratio (Qn1/Qm1) is a constant value. Under the condition of pressure difference P2, both of measurement passage 4 and non-measurement passage 5 are in turbulent areas, therefore, dividing ratio (Qn2/Qm2) is also a constant value. That is, on the condition that both of measurement passage 4 and non-measurement passage 5 are turbulent areas; and the flow rate and the pressure difference are in square relationship, the value of the dividing ratio in the case of a turbulent flow and the value of the dividing ratio in the case of a laminar flow are the same in the respective areas.

However, as in FIG. 7A, in the case where the pressure difference is, for example, Ps, the target fluid in measurement passage 4 is laminar and the target fluid in non-measurement passage 5 is turbulent. Therefore, in the case where measurement passage 4 and non-measurement passage 5 are the flow areas of different conditions as described above, dividing ratio (Qns/Qms) is not necessarily a constant value. That is, in the case where the conditions of the target fluids in the flow areas are different for a laminar flow and a turbulent flow, the dividing ratio changes according to the flow rates of the flows through measurement passage 4 and non-measurement passage 5. Estimation of the flow rate of the whole tubular passage 2 based on measurement of the flow rate of measurement passage 4 performed in the above described state causes a decrease in accuracy of measuring the flow rate.

Figure 7B:
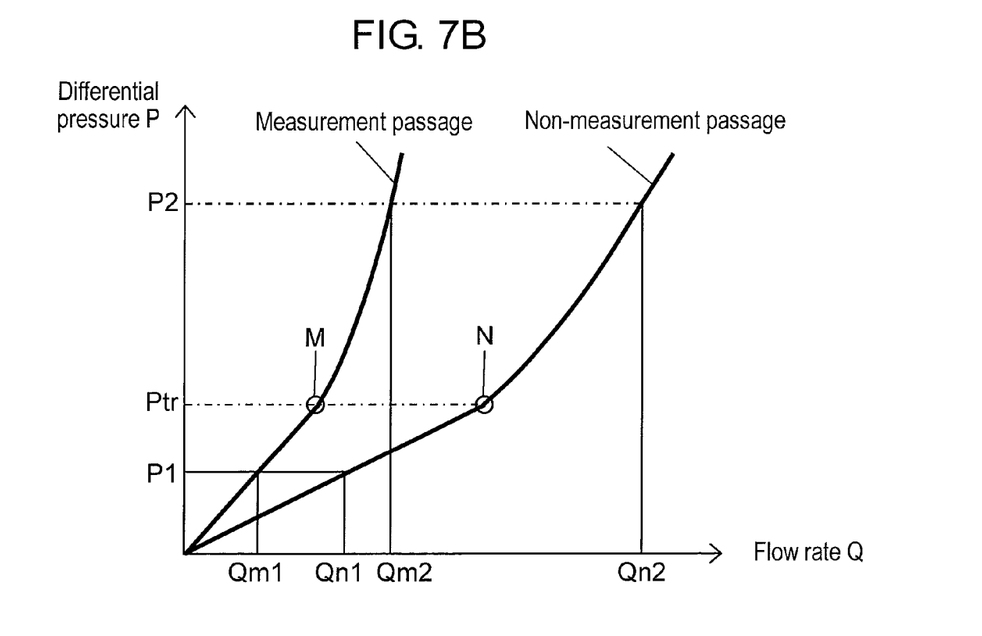
FIG. 7B is a diagram illustrating another example of graph of pressure-flow rate characteristics according to the third exemplary embodiment of the present invention.

Then, as in FIG. 7B, on the condition that the ultrasonic flow-meter of the exemplary embodiment is configured to make transition from a laminar flow to a turbulent flow occur at transition point M in measurement passage 4 and transition point N in non-measurement passage 5 by the same pressure difference Ptr, a decrease in accuracy of measuring the flow rate can be avoided. That is, by having a resistance value for resistance body 22 (for example, a change in shape or size of the mesh) to be disposed in non-measurement passage 5 selected, there can be realized conditions for not changing the dividing ratio of the target fluids which are flowing through measurement passage 4 and non-measurement passage 5 even though the flow rate of the target fluid of tubular passage 2 changes. As a result, the ultrasonic flow-meter of the exemplary embodiment can estimate and calculate the flow rate or the velocity of the target fluid with high measuring accuracy by making transition from a laminar flow to a turbulent flow occur in measurement passage 4 and non-measurement passage 5 by the same pressure difference.

According to the exemplary embodiment, resistance body 22 which forms a structural body for making transition from laminar to turbulent occur in measurement passage 4 and non-measurement passage 5 by the same pressure difference at the same time is disposed in non-measurement passage 5. Accordingly, the ultrasonic flow-meter of the exemplary embodiment can estimate the flow rate of whole tubular passage 2 for the whole flow areas by measuring the flow rate of measurement passage 4. As a result, the ultrasonic flow-meter can accurately estimate and obtain an entire flow rate of the target fluid flowing through tubular passage 2 based on the flow rate of measurement passage 4. Further, the ultrasonic flow-meter can easily realize accurate flow rate measurement conditions according to, for example, measuring range of the ultrasonic flow-meter by selection of resistance body 22.

Fourth Exemplary Embodiment

An ultrasonic flow-meter according to a fourth exemplary embodiment of the present invention will be described below with reference to FIG. 8. Descriptions of the same constituent elements, functions, and the like as those of the ultrasonic flow-meter of the third exemplary embodiment will be omitted.

Figure 8:
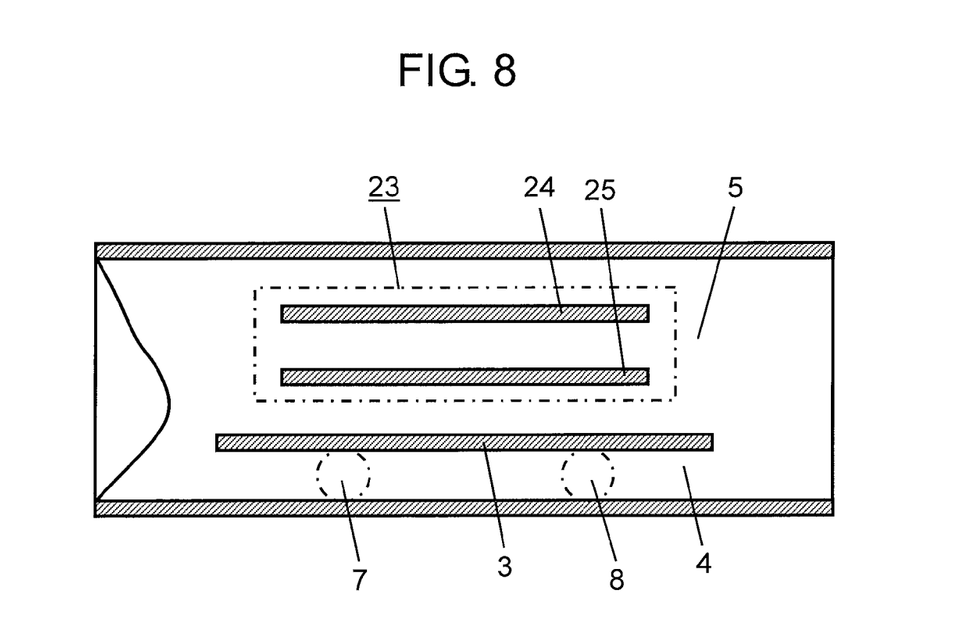
FIG. 8 is a cross-sectional view of an ultrasonic flow-meter according to a fourth exemplary embodiment of the present invention.

FIG. 8 is a cross-sectional view of the ultrasonic flow-meter according to the fourth exemplary embodiment of the present invention. FIG. 8 illustrates a cross-sectional view of the ultrasonic flow-meter of the fourth exemplary embodiment taken along line 4-4 shown in FIG. 1 as in FIG. 4 described in the first exemplary embodiment.

As illustrated in FIG. 8, the ultrasonic flow-meter of the fourth exemplary embodiment is different from the ultrasonic flow-meter of the third exemplary embodiment in that structural body 23 disposed in non-measurement passage 5 is made of a plurality of resistance plates 24, 25 (two in the exemplary embodiment). Since the other constituent elements are basically the same as those in the third exemplary embodiment, the constituent elements will be denoted by the same reference symbols and described.

That is, as illustrated in FIG. 8, the plurality of resistance plates 24, 25 are disposed in non-measurement passage 5, for example, in a flow direction of the target fluid. Therefore, as described in the third exemplary embodiment, the ultrasonic flow-meter of the exemplary embodiment can make transition from a laminar flow to a turbulent flow occur in the target fluids which are flowing into measurement passage 4 and non-measurement passage 5 by the same pressure difference.

According to the exemplary embodiment, a structural body can be formed of resistance plates 24, 25 which are made of, for example, plate members. As a result, the ultrasonic flow-meter which can provide the same functions as those of the third exemplary embodiment and is also easily produced and provide high productivity can be realized.

Although the present exemplary embodiment has been described by an example of forming the structural body by two resistance plates, the structural body is not limited to that and may be formed by one resistance plate or three or more resistance plates, which may be optionally selected according to the flow rate or the flow velocity to be measured.

Further, although the present exemplary embodiment has been described by an example of disposing the resistance plates along the flow of the target fluid, the arrangement is not limited to that. For example, the resistance plate(s) may be disposed at a predetermined angle to the flow of the target fluid or a resistance plate in an optional shape may be disposed in addition to straight resistance plate(s), as far as the resistance plate(s) is configured to make transition from a laminar area to a turbulent area occur in the target fluids which are flowing through the measurement passage and the non-measurement passage by the same pressure difference.

Fifth Exemplary Embodiment

An ultrasonic flow-meter according to a fifth exemplary embodiment of the present invention will be described below with reference to FIG. 9 and FIG. 10. Descriptions of the same constituent elements, functions, and the like as those of the ultrasonic flow-meter of the first exemplary embodiment will be omitted.

Figure 9:
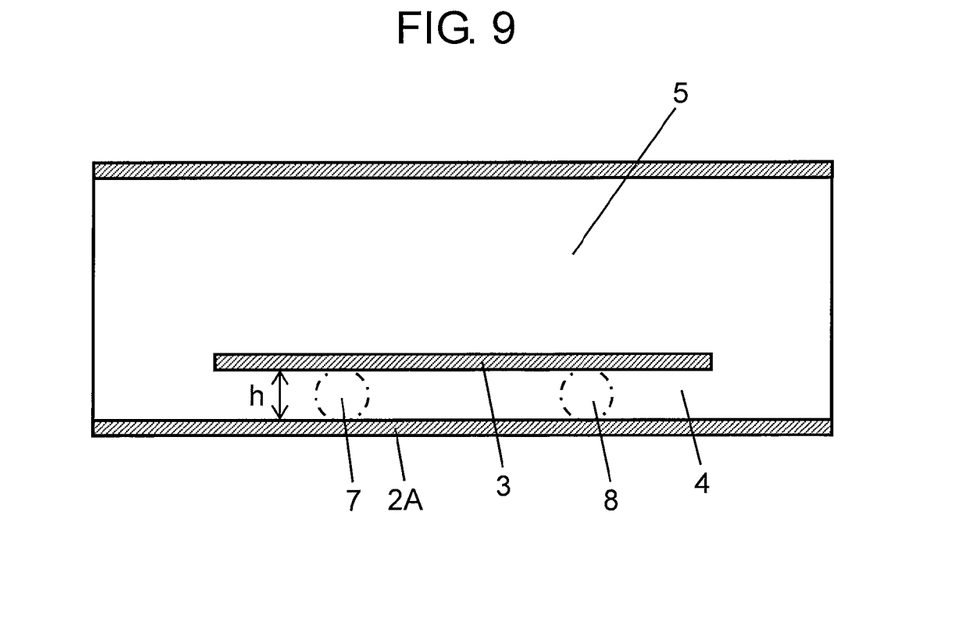
FIG. 9 is a cross-sectional view of an ultrasonic flow-meter according to a fifth exemplary embodiment of the present invention.

FIG. 9 is a cross-sectional view of the ultrasonic flow-meter according to the fifth exemplary embodiment of the present invention. FIG. 10 is a diagram illustrating an example of graph of pressure-flow rate characteristics according to the fifth exemplary embodiment of the present invention. FIG. 9 illustrates a cross-sectional view of the ultrasonic flow-meter of the fifth exemplary embodiment taken along line 4-4 shown in FIG. 1 as in FIG. 4 described in the first exemplary embodiment.

As illustrated in FIG. 9, the ultrasonic flow-meter of the fifth exemplary embodiment is different from the ultrasonic flow-meter of the first exemplary embodiment in that height h (a distance between partition plate 3 and external wall 2A of tubular passage 2 which are facing each other across measurement passage 4) of measurement passage 4 is set to a value which keeps at least the target fluid flowing through measurement passage 4 laminar for the whole range of flow rate to be measured of the ultrasonic flow-meter.

Since the other constituent elements are basically the same as those in the first exemplary embodiment, the constituent elements will be denoted by the same reference symbols and described.

That is, as illustrated in FIG. 9, height h of measurement passage 4 is set to a value which keeps the target fluid laminar for the whole range of flow rate to be measured of the ultrasonic flow-meter.

Generally, as for height h of measurement passage 4, in the case where measurement passage 4 has a rectangular passage cross section with a large aspect ratio (long side length/short side length), Reynolds number Re is obtained by equation (4) below where the short side length corresponding to height h is a characteristic length $$Re = (h \times Vave)/v \quad (4)$$

where Re is the Reynolds number, h is the characteristic length, and Vave is an average flow velocity.

Therefore, the ultrasonic flow-meter can make the target fluid flow in a laminar state by having height h of measurement passage 4 set based on equation (4).

Operation and functions of ultrasonic flow-meter 1 of the exemplary embodiment will be described below.

Figure 10:
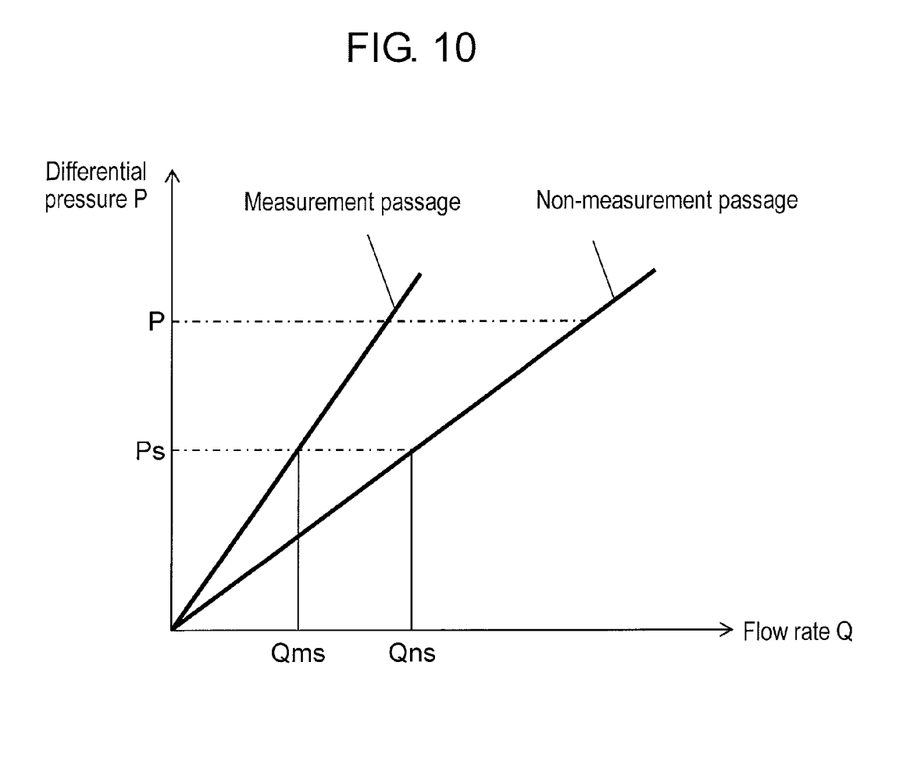
FIG. 10 is a diagram illustrating an example of graph of pressure-flow rate characteristics according to the fifth exemplary embodiment of the present invention.

First, as illustrated in FIG. 10, height h of measurement passage 4 is set to make the flow of the target fluid in measurement passage 4 laminar for the whole flow area of the target fluid, i.e., to the maximum flow rate to be measured of the fluid. At that moment, on the condition that relationship between the pressure difference and the flow rate of the target fluid flowing through non-measurement passage 5 is also set to make the flow of the target fluid laminar, dividing ratio (Qn/Qm) is constant for the whole flow area of the target fluid.

On the other hand, on the condition that the whole flow area of the target fluid in non-measurement passage 5 includes a turbulent area and relationship between the pressure difference and the flow rate is not linear, the dividing ratio is not constant. However, since the flow rate or the like of the target fluid of measurement passage 4 can be measured in a laminar area, a very stable value can be obtained.

According to the exemplary embodiment, the ultrasonic flow-meter can measure the flow rate of the target fluid in a laminar state throughout the flow area of the target fluid, at least in the measurement passage. As a result, the ultrasonic flow-meter of the exemplary embodiment can measure and estimate the flow rate of the target fluid with high measuring accuracy by keeping dividing ratio (Qn/Qm) of the target fluid of the measurement passage and the non-measurement passage constant.

Sixth Exemplary Embodiment

An ultrasonic flow-meter according to a sixth exemplary embodiment of the present invention will be described below with reference to FIG. 11. Descriptions of the same constituent elements, functions, and the like as those of the ultrasonic flow-meter of the first exemplary embodiment will be omitted.

Figure 11:
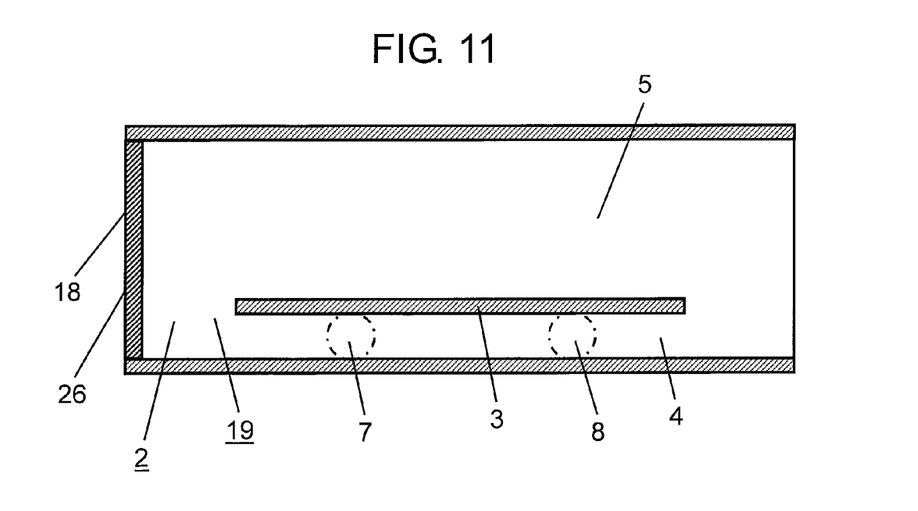
FIG. 11 is a cross-sectional view of an ultrasonic flow-meter according to a sixth exemplary embodiment of the present invention.

FIG. 11 is a cross-sectional view of the ultrasonic flow-meter according to the sixth exemplary embodiment of the present invention. FIG. 11 illustrates a cross-sectional view of the ultrasonic flow-meter of the sixth exemplary embodiment taken along line 4-4 shown in FIG. 1 as in FIG. 4 described in the first exemplary embodiment.

As illustrated in FIG. 11, the ultrasonic flow-meter of the sixth exemplary embodiment is different from the ultrasonic flow-meter of the first exemplary embodiment in that flow-rectifying member 26 is disposed at inlet part 18 of tubular passage 2. Since the other constituent elements are basically the same as those in the first exemplary embodiment, the constituent elements will be denoted by the same reference symbols and described.

That is, as illustrated in FIG. 11, flow-rectifying member 26 is disposed at inlet part 18 of tubular passage 2 of ultrasonic flow-meter 1. As a result, turbulence or a drift of the target fluid flowing into tubular passage 2 is reduced. Then, dividing of the target fluid into measurement passage 4 and non-measurement passage 5 or stabilization of the flow of the target fluid of measurement passage 4 can be achieved. As a result, accuracy of measuring the flow rate or the like of the target fluid of measurement passage 4 can be improved.

According to the exemplary embodiment, since a flow-rectifying member is provided, turbulence and a drift of the flow of the target fluid can be reduced, thus realizing an ultrasonic flow-meter which measures the flow rate or the like of the target fluid with high measuring accuracy.

Although the present exemplary embodiment has been described by an example of disposing flow-rectifying member 26 at inlet part 18 of tubular passage 2, the arrangement is not limited to that. For example, flow-rectifying member 26 may be disposed at any place in introductory space part 19 (a passage between partition plate 3 and inlet part 18), by which the same effect as that described above can be obtained. Alternatively, flow-rectifying member 26 may be disposed only in non-measurement passage 5. Accordingly, occurrence of a whirlpool or turbulence of the target fluid in non-measurement passage 5 can be reduced. As a result, an ultrasonic flow-meter which measures the flow rate or the like of the target fluid with high measuring accuracy by further stabilizing the dividing ratio between measurement passage 4 and non-measurement passage can be realized.

As described above, the ultrasonic flow-meter of the present invention includes a partition plate which partitions a passage of a target fluid and a non-measurement passage, a pair of ultrasonic transducers which are disposed in the measurement passage, a measuring unit which measures a propagation time of an ultrasonic wave between the pair of ultrasonic transducers, and a calculating unit which calculates a flow rate of the target fluid. Further, the calculating unit has a computing unit which computes at least one of a flow velocity and a flow rate of the target fluid in the measurement passage based on the propagation time and an estimating unit which estimates the flow rate of the target fluid in the passage based on the flow velocity or the flow rate in the measurement passage.

With this configuration, since the target fluid is branched into the measurement passage by only one partition plate, parameters for defining the flow condition of the branch can be reduced. Further, a simple and compact ultrasonic flow-meter can be realized. As a result, dividing ratio (Qn/Qm) between the flow rate of the measurement passage and the flow rate of the non-measurement passage can be kept almost constant (including constant) for the whole flow area for measurement, where Qm is the flow rate of the measurement passage and Qn is the flow rate of the non-measurement passage. Therefore, the ultrasonic flow-meter can accurately estimate the flow rate of the whole target fluid flowing through the passage as compared with the case where the dividing ratio becomes a complicated function and an error is introduced by linear approximation.

According to the ultrasonic flow-meter of the present invention, the upstream end of the partition plate is formed in a wedge shape. With that configuration, the target fluid is divided into the measurement passage and the non-measurement passage at the wedge shaped tip. Therefore, the target fluid in an upstream part of the partition plate can smoothly be divided into the measurement passage and the non-measurement passage by further reducing occurrence of turbulence or the like. Accordingly, dividing ratio (Qn/Qm) can be kept more constant. As a result, the ultrasonic flow-meter can more accurately estimate the flow rate of the whole target fluid flowing through the passage.

Further, the ultrasonic flow-meter of the present invention further includes a structural body which makes the target fluid become turbulent in both the measurement passage and the non-measurement passage at the same time. With that configuration, the dividing ratio can be kept constant even if the flow rate of the target fluid flowing through the passage changes. As a result, the ultrasonic flow-meter allows flow rate measurement conditions which enables accurate measurement of the flow rate or the like of the target fluid to be set.

Further, according to the ultrasonic flow-meter of the present invention, the structural body is a resistance body which is disposed in the non-measurement passage. With that configuration, the ultrasonic flow-meter needs not to adopt any particularly devised member as a structural body. As a result, with a simple configuration, the dividing ratio can be kept constant even if the flow rate of the target fluid flowing through the passage changes.

Further, according to the ultrasonic flow-meter of the present invention, the structural body is formed of a resistance plate(s). As a result, the resistance plates to form the structural body can be easily produced.

Further, according to the ultrasonic flow-meter of the present invention, the height of the measurement passage is set to make the target fluid flowing through the measurement passage a laminar flow at least at the maximum flow rate to be measured. With that configuration, the ultrasonic flow-meter can measure the flow rate or the like of the target fluid of the measurement passage in the laminar area. Accordingly, the ultrasonic flow-meter can very stably measure the target fluid. As a result, the ultrasonic flow-meter can accurately measure the flow rate or the like of the target fluid.

Further, according to the ultrasonic flow-meter of the present invention, the introductory space part is disposed upstream of the partition plate provided in the passage. With that configuration, the flow of the target fluid is rectified in the introductory space part to be divided more smoothly and stably. As a result, the target fluid can be measured more stably in the measurement passage.

Further, according to the ultrasonic flow-meter of the present invention, the flow-rectifying member is disposed at the inlet part of the passage. With that configuration, turbulence or a drift of the flow of the target fluid flowing into the passage can be reduced. This establishes stability in dividing of the target fluid into the measurement passage and the non-measurement passage and the flow of the target fluid in the measurement passage. As a result, accuracy of measuring the target fluid in the measurement passage can further be improved.

Further, according to the ultrasonic flow-meter of the present invention, the flow-rectifying member is disposed in the non-measurement passage. With that configuration, occurrence of a whirlpool or turbulence of the fluid in the non-measurement passage can be reduced. As a result, the dividing ratio between the fluid in the non-measurement passage and the target fluid flowing through the measurement passage is further stabilized and accuracy of measuring the target fluid in the measurement passage can further be improved.

Further, according to the ultrasonic flow-meter of the present invention, the flow-rectifying member is disposed in the introductory space part. With that configuration, an installation range of the flow-rectifying member can optionally be arranged. As a result, the ultrasonic flow-meter with outstanding versatility can be realized.

INDUSTRIAL APPLICABILITY

The ultrasonic flow-meter of the present invention can highly accurately measure the target fluid, and therefore, it can useful for various purposes of measuring the flow rate, particularly, in fields of gas meters and the like which are required to be simple to use and more compact.

The invention claimed is:

1. An ultrasonic flow-meter comprising:
   a partition plate which partitions a passage of a target fluid into a measurement passage and a non-measurement passage;
   a pair of ultrasonic transducers which are disposed in the measurement passage;
   a measuring unit which measures a propagation time of an ultrasonic wave between the pair of ultrasonic transducers; and
   a calculating unit which calculates a flow rate of the target fluid,
   wherein the calculating unit has a computing unit which computes at least one of a flow velocity and a flow rate of the target fluid in the measurement passage based on the propagation time, and an estimating unit which estimates the flow rate of the target fluid in the passage based on the flow velocity or the flow rate in the measurement passage.

2. The ultrasonic flow-meter according to claim 1, wherein an upstream end of the partition plate is formed into a wedge shape.

3. The ultrasonic flow-meter according to claim 1, further comprising a structural body which makes the target fluid become turbulent in both the measurement passage and the non-measurement passage at the same time.

4. The ultrasonic flow-meter according to claim 3, wherein the structural body is a resistance body disposed in the non-measurement passage.

5. The ultrasonic flow-meter according to claim 3, wherein the structural body is formed of a resistance plate.

6. The ultrasonic flow-meter according to claim 1, wherein a height of the measurement passage is configured to make at least the target fluid flowing through the measurement passage a laminar flow at a maximum flow rate to be measured.

7. The ultrasonic flow-meter according to claim 1, wherein an introductory space part is disposed upstream of the partition plate which is provided in the passage.

8. The ultrasonic flow-meter according to claim 1, wherein a flow-rectifying member is disposed at an inlet part of the passage.

9. The ultrasonic flow-meter according to claim 1, wherein a flow-rectifying member is disposed in the non-measurement passage.

10. The ultrasonic flow-meter according to claim 7, wherein a flow-rectifying member is disposed in the introductory space part.

* * * * *